United States Patent [19]

Stenzel et al.

[11] Patent Number: 5,292,713
[45] Date of Patent: Mar. 8, 1994

[54] LINERLESS THERMAL AND THERMAL TRANSFER LABELS

[76] Inventors: Herbert J. Stenzel, 7834 Michael Rd., Orchard Park, N.Y. 14127; William D. Swiercz, 5568 Juno Dr., Lakeview, N.Y. 14085

[21] Appl. No.: 914,116

[22] Filed: Jul. 15, 1992

[51] Int. Cl.⁵ .............................. B41M 5/20; B32B 7/12
[52] U.S. Cl. .................................. 503/226; 503/200; 428/40; 428/354; 428/913
[58] Field of Search ............... 428/354, 40, 42, 913; 503/200, 226

[56] References Cited

U.S. PATENT DOCUMENTS

| | | | |
|---|---|---|---|
| 4,104,102 | 8/1978 | Eagon et al. | 428/40 |
| 4,444,819 | 4/1984 | Maruta et al. | 346/209 |
| 4,577,204 | 3/1986 | Shibata et al. | 346/200 |
| 4,590,497 | 5/1986 | Shibata et al. | 346/201 |
| 4,633,276 | 12/1986 | Shibata et al. | 428/40 |
| 4,647,497 | 3/1987 | Weeks | 428/284 |
| 4,707,211 | 11/1987 | Shibata | 156/354 |
| 4,740,495 | 4/1988 | Marinelli et al. | 503/214 |
| 4,784,714 | 11/1988 | Shibata | 156/354 |
| 4,851,383 | 7/1989 | Fickenscher et al. | 503/200 |
| 4,898,849 | 2/1990 | Kang | 503/214 |
| 5,183,696 | 2/1993 | Sanderson | 428/194 |

OTHER PUBLICATIONS

"In-Line Coverting UV Silicone and Hot Melt Combined for General Purpose Tapes and Labels", McIntyre, Adhesives Age, Nov., 1983, pp. 31-33.

"Packaging Week" Magazine, Nov. 29, 1989, p. 27, "Rising Thermals".

Primary Examiner—George F. Lesmes
Assistant Examiner—Blaine Copenheaver
Attorney, Agent, or Firm—Nixon & Vanderhye

[57] ABSTRACT

Thermosensitive linerless labels (either thermal labels or thermal transfer labels) which can be used with food products contain a pressure sensitive adhesive covering one face of a substrate having a thermosensitive layer on the opposite face, and a release coat covering the thermosensitive layer. The release coating is preferably applied directly to the thermosensitive layer, and preferably is prepared by application and then drying of a formulation containing between about 5-25 parts chromium pentahydroxy (tetradecanoato) di-, and about 75-95% water or alcohol. Alternatively, the release coating may be a UV curable silicone with about 1-3% by weight photoinitiator. After the coatings are applied, the stock is dried in a manner that will not adversely affect the thermosensitive layer, e.g. by ultraviolet rays, or air drying at a temperature of less than 150° F. A web comprising the substrate may be slit into individual rolls, and perfing or die cutting is practiced to form individual labels.

7 Claims, 1 Drawing Sheet

LINERLESS THERMAL AND THERMAL TRANSFER LABELS

BACKGROUND AND SUMMARY OF THE INVENTION

It is very desirable to produce thermal labels and thermal transfer labels that are linerless, so as to avoid the costs and difficulty associated with disposing of the release liner. Such labels are disclosed in U.S. Pat. No. 4,851,383. The labels described in that patent have a thermosensitive layer with dye for forming color images, and a silicone release coating. It is necessary to provide a barrier layer between the silicone release layer and the thermosensitive material, which increases the cost of production of the linerless labels. Also, the labels provided thereby are of questionable use for the food industry.

According to the present invention, linerless thermosensitive label stock is produced that may be readily utilized in the food industry, and which has a simplified construction compared to the prior art exemplified by U.S. Pat. No. 4,851,383. The term "thermosensitive" as used in the present specification and claims is intended to encompass both thermal transfer and thermal mechanisms.

According to one aspect of the present invention, linerless thermosensitive labels are produced by applying a release coating, of a material that has a low adherence to pressure sensitive adhesive that is part of the label stock, directly onto the thermosensitive layer, rather than requiring a barrier layer. The release coating is preferably a USDA approved coating. One particularly suitable coating which not only is USDA approved, but will not in any way adversely affect the thermosensitive label (as by tinting it a different color) contains as the primary operative ingredient chromium pentahydroxy (tetradecanoato) di-. This is available commercially under the trade name "QUILON C". The coating is preferably prepared by application then drying of a formulation containing between about 5-25 parts QUILON C, and about 75-95 parts water or alcohol.

Alternatively, the release coating may comprise a UV curable silicone, such as that available commercially from General Electric under the designation "G. E. 9300" and containing about 1-3% by weight photoinitiator (e.g. UV 9365C-D1).

The invention also contemplates a method of making a supply of linerless thermosensitive labels, from a substrate having a thermosensitive layer on a first face thereof, and a second face. The method comprises the following steps: (a) Continuously moving the substrate in a first direction. (b) Applying a pressure sensitive adhesive coating so that it covers the second face of the moving substrate. (c) Applying a release coating directly to the thermosensitive layer, the release coating having non-stick or low adhesion characteristics with respect to the pressure sensitive adhesive. (d) Drying the pressure sensitive adhesive and release coatings under conditions which do not cause significant adverse reaction of the thermosensitive layer (if necessary,if a hot melt adhesive was applied no drying equipment would be necessary). And, rolling the substrate into a roll, with the release coated second face on the outside of the roll. Step (d) may be accomplished by air drying at less than 150° F., or by UV, radio frequency, or like non-destructive drying. Between steps (d) and (e), if the substrate is a web it may be slit into individual rolls, and perfed or die cut to form individual linerless labels in the roll. The rolls are tested for compliance with USDA requirements prior to use with food products, and printed, e.g. using a Hobart Scale.

According to another aspect of the present invention, a method of making a supply of linerless thermosensitive labels is provided which comprises the following steps: (a) Continuously moving the substrate in a first direction. (b) Applying a pressure sensitive adhesive coating so that it covers the second face of the moving substrate. (c) Applying a release coating so that it covers the thermosensitive layer, by making a formulation comprising or consisting essentially of about 5-25 parts chromium pentahydroxy (tetradecanoato) di- and about 75-95 parts water or alcohol, and applying that formulation so that it covers the thermosensitive layer. (d) Drying the pressure sensitive adhesive and release coatings under conditions which do not cause significant adverse reaction of the thermosensitive layer. (Steps (b) and (c) can be performed in any order, with the drying steps simultaneously, or at different times). And, then (e) rolling the substrate into a roll, with the release coated second face on the outside of the roll.

It is the primary object of the present invention to simply yet effectively produce linerless thermosensitive label stock, including stock that can be used on food products. This and other objects of the invention will become clear from an inspection of the detailed description of the invention, and from the appended claims.

DETAILED DESCRIPTION OF THE DRAWINGS

Figure 1:
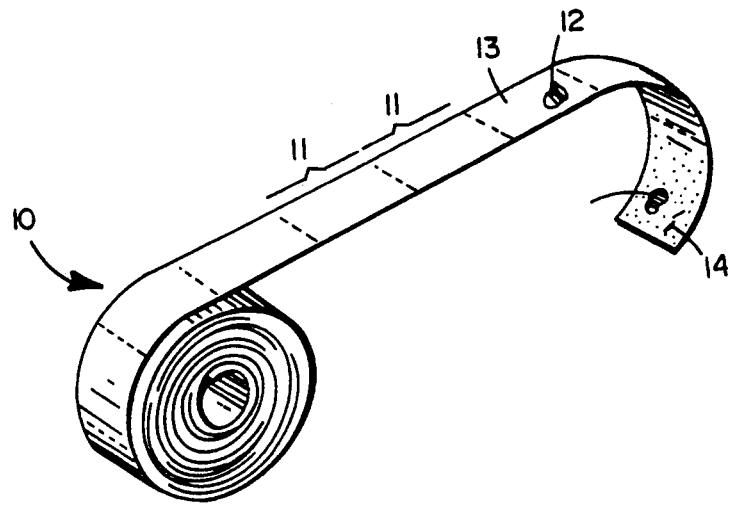
FIG. 1 is a schematic perspective view of an exemplary roll of thermosensitive linerless labels produced according to the invention.
Figure 2:
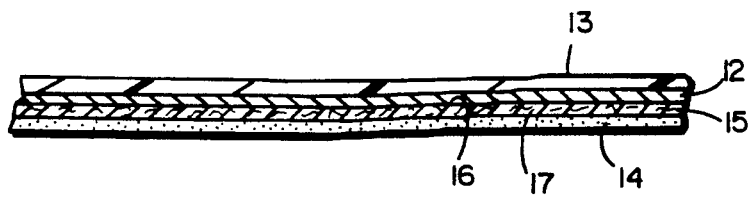
FIG. 2 is a side schematic cross-sectional view showing an exemplary linerless label construction according to the invention, with the various layers being magnified for clarity of illustration.

An exemplary thermosensitive label stock, in the form of a roll 10, according to the present invention is seen in FIG. 1. Stock 10 may be in the form of individual linerless labels 11 each label being separated from the next by die cut or perf lines, or the labels may be cut from the stock 10 just prior to use. Reference numeral 12 illustrates a thermosensitive layer on the top or outer face of the stock 10, which is covered by a release coating 13, while reference numeral 14 illustrates pressure sensitive adhesive that covers the bottom face of substrate 15. Substrate 15 (see FIG. 2) has a first face 16 and a second face 17.

The substrate 15 may comprise any suitable conventional substrate such as a high quality paper, plastic, or the like, and the thermosensitive layer 12 can be any suitable conventional thermal or thermal transfer material. Preferably in the practice of the invention method where the linerless labels are constructed, conventional thermal paper, which already has the thermosensitive layer 12 on a substrate 15, is purchased from a supplier such as Appleton, Kanzaki, Oji, Rittenhouse, Green Bay Packing, etc. The layer 12 typically does not have pigments or dyes.

The pressure sensitive adhesive 14 is preferably applied directly to the second, bottom, face 17 of the substrate 15. However as disclosed in co-pending application Serial No. 07/912,851 filed Jul. 13, 1992, a tie coating may be provided if necessary to secure proper adhesion between the pressure sensitive adhesive (PSA) 14 and the substrate 15. The PSA may be any of a wide variety of commercially available adhesives, such as a hot melt permanent pressure sensitive adhesive (e.g. Findley Adhesive 82181), or a repositional adhesion, such as utilized with products sold under the trademark "NOTESTIX", by Moore Business Forms, Inc. of Lake Forest, Ill., such as a Monocoat formulation, or "Clean-Tac" TM adhesive or a water based permament pressure sensitive adhesive (e.g. Franklin Covinax). The invention does not relate to the particular formulation of the pressure sensitive adhesive 14, it only being necessary that the PSA 14 will not adhere to the release coat 13, or it will easily release from this release coat 13.

The release coat 13 is preferably applied directly to the layer 12, yet it will not tint the thermal paper (some release coats tint thermal layers green, or another color), and is USDA approved. An entirely suitable release coat for this purpose is prepared from a product of DuPont Chemical Company sold under the trade name "QUILON C", CIS number of 65229-24-5, and comprising chromium pentahydroxy (tetradecanoato) di-. Preferably the release coat is prepared by making a formulation comprising 5-25 parts QUILON C to 75-95 parts water or alcohol.

Alternatively, the release coat 13 may be a UV curable silicone. One particularly useful silicone formulation that may be applied is available under the trade name G. E. 9300, which is mixed with about 1-3% photoinitiator UV 9365C-D1. The UV curable silicone is also preferably USDA approved.

Figure 3:
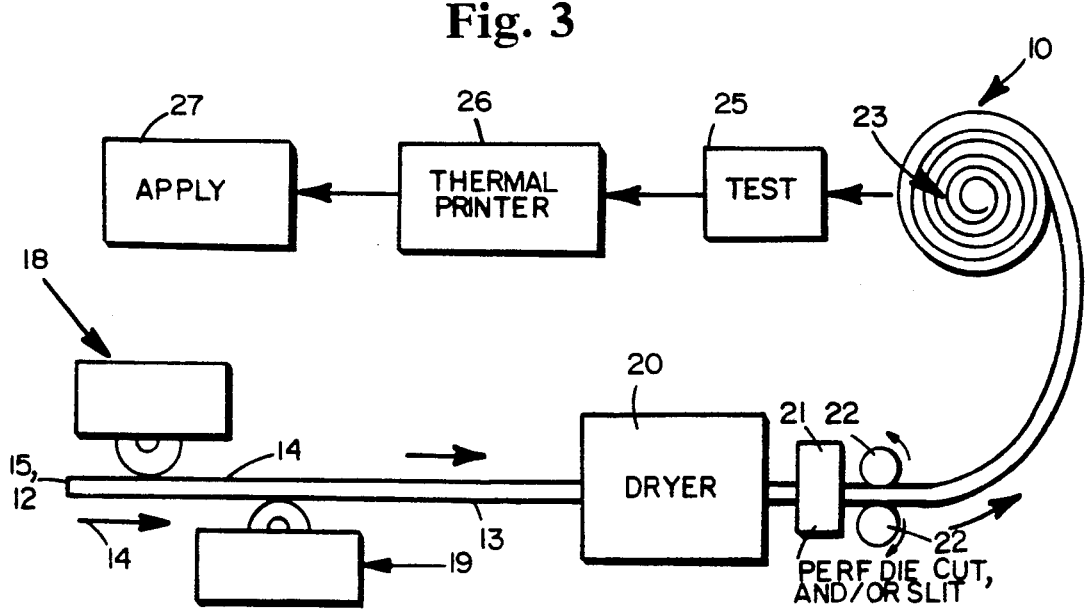
FIG. 3 is a schematic view illustrating exemplary apparatus for practice of an exemplary method according to the invention.

In the production of the roll 10 according to the invention, the apparatus illustrated in FIG. 3 is utilized. The substrate with thermosensitive layer, 15, 12 (which may be in web form), such as Appleton Direct Thermal Paper, is moved in the direction of the arrow A to conventional coaters 18, 19 which apply the PSA 14 and the release coat 13, respectively. The coater 18 could be of the type in which dry adhesive is applied on a belt and transferred to the thermal paper 12 (e.g. a coater from Pagendarem). Then the coatings 13, 14 are dried by the dryer 20. The dryer must be capable of effecting drying while not in any way adversely affecting or degrading (e.g. blackening) the thermosensitive layer 12. For example the dryer 20 may be one which emits ultraviolet or radio-frequency radiation (assuming that the PSA and the release coat 14, 13 are capable of being dried in that manner), or may be an oven that is long enough, and through Which the web 15, 12 passes at a slow enough speed, such that air drying can be accomplished at a temperature of less than 150° F. Hot melt adhesives do not require special drying equipment.

After drying, the web 15, 12 may be taken up directly, but preferably passes through the apparatus 21. Apparatus 21 slits the web into the individual rolls 10, and/or provides perfing or die cutting perpendicular to the direction A so as to form the individual linerless labels 11. The web is fed by the drive rolls 22 to a take up mechanism 23.

If all of the coating steps are practiced on a press, then indicia may be printed (e.g. "Giant Food", or "Safeway") first, followed by the release and adhesive coating applications.

After construction of a roll 10, it (or representative samples) are tested for suitability for food products, as illustrated schematically by test station 25 in FIG. 3. The test station 25 preferably tests for the amount of chromium present on the paper, and may include a Portaspec instrument. The linerless labels 11 may be printed with a thermal printer 26 (such as a Hobart Scale), to provide human readable indicia, bar coding, or the like, and then ultimately the linerless labels are applied—as indicated by block 27—to food products or other elements such as packages, envelopes, etc. Of course the labels may be applied first and then run through the thermal printer, or printing and application may be done substantially simultaneously, such as when utilizing a Hobart Scale.

The basic method of producing linerless label stock, and the linerless labels so produced having been described, some specific examples will now be set forth:

EXAMPLE 1

A pressure sensitive water based adhesive—such as, NOTE STIX ® or CLEANTAC TM —formulation was produced, and a release formulation was prepared from 10 parts QUILON C and 90 parts water. The PSA 14 was applied by coater 18 to the backside of a web of Appleton Direct Thermal Paper, while the release coat 13 was applied by mechanism 19 directly on the thermosensitive layer of the Appleton paper. Drying in dryer 20 was accomplished by air drying at a temperature of less than 150° F. When the roll 10 so formed was tested on a Portaspec instrument the amount of chromium present was small, well within requirements, including for direct contact with meat or poultry. Human readable indicia and bar coding were then printed utilizing a Hobart Scale, and the thermal image printed was easily read and the bar code was successfully scanned.

EXAMPLE 2

In this example, a pressure sensitive hot melt formulation was produced from a commercially available Findley Adhesive H2181 or Franklin International Covinax 324. The same thermal paper as in Example 1 was utilized, but the release coat 13 was a formulation of UV curable silicone namely G. E. 9300 silicone with about 1-3% by weight photoinitiator UV 9365-C-D1. Drying of the release coating 13 was accomplished by directing UV radiation (in 20) at the release coating 13. When a thermal image and bar code were printed on a Hobart Scale, the image was readily visible, and the bar code was successfully scanned.

It will thus be seen that according to the present invention linerless thermosensitive label stock, and a method of making thermosensitive linerless labels, have been provided which are simple yet advantageous. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and processes.

What is claimed is:

1. Linerless thermosensitive label stock, comprising: a substrate having first and second faces;

a pressure sensitive adhesive covering said second face of said substrate;

a thermosensitive layer on said first face of said substrate; and a release coating, of a material that has a low adherence to said pressure sensitive adhesive, directly on and covering said thermosensitive layer, with no barrier coat between said release coating and said thermosensitive layer, said release coating containing as the primary operative ingredient chromium pentahydroxy (tetradecanoato) di-.

2. Stock as recited in claim 1 wherein said release coating is prepared by application and then drying of a formulation consisting essentially of about 5-25 parts chromium pentahydroxy (tetradecanoato) di- and about 75-95 parts water or alcohol.

3. Stock as recited in claim 1 wherein said pressure sensitive adhesive is directly on and covering said second face of said substrate.

4. Linerless thermosensitive label stock, comprising:
a substrate having first and second faces;
a pressure sensitive adhesive covering said second face of said substrate;

a thermosensitive layer on said first face of said substrate; and a release coat, of a material that has a low adherence to said pressure sensitive adhesive, covering said thermosensitive layer, said release coating containing as the primary operative ingredient chromium pentahydroxy (tetradecanoato) di-.

5. Stock as recited in claim 4 wherein said pressure sensitive adhesive is directly on and covering said second face of said substrate.

6. Stock as recited in claim 4 wherein said release coating is prepared by application and then drying of a formulation consisting essentially of about 5-25 parts chromium pentahydroxy (tetradecanoato) di- and about 75-95 parts water or alcohol.

7. Stock as recited in claim 6 wherein said release coat is directly on said thermosensitive layer, and said pressure sensitive adhesive is directly on said second face of said substrate.

* * * * *

UNITED STATES PATENT AND TRADEMARK OFFICE
CERTIFICATE OF CORRECTION

PATENT NO. : 5,292,713
DATED : March 8, 1994
INVENTOR(S) : Stenzel et al

It is certified that error appears in the above-indentified patent and that said Letters Patent is hereby corrected as shown below:

On the title page, after item [76] insert the following:

--Moore business Forms, Inc., Grand Island, New York--.

Signed and Sealed this

Twentieth Day of June, 1995

Attest:

BRUCE LEHMAN

Attesting Officer

Commissioner of Patents and Trademarks